United States Patent
LeMay

(10) Patent No.: US 12,019,733 B2
(45) Date of Patent: Jun. 25, 2024

(54) COMPARTMENT ISOLATION FOR LOAD STORE FORWARDING

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 17/692,464

(22) Filed: Mar. 11, 2022

(65) Prior Publication Data
US 2022/0197993 A1    Jun. 23, 2022

(51) Int. Cl.
*G06F 21/52* (2013.01)

(52) U.S. Cl.
CPC ........ *G06F 21/52* (2013.01); *G06F 2221/034* (2013.01)

(58) Field of Classification Search
CPC ..... G06F 21/52; G06F 2221/034; G06F 21/79
See application file for complete search history.

(56) References Cited

U.S. PATENT DOCUMENTS

| | | | | |
|---|---|---|---|---|
| 10,445,528 | B2* | 10/2019 | Risney, Jr. | G06F 21/53 |
| 10,482,226 | B1* | 11/2019 | Konrardy | B60W 40/04 |
| 10,860,709 | B2 | 12/2020 | Lemay et al. | |
| 11,030,113 | B1 | 6/2021 | Durham et al. | |
| 11,036,850 | B2 | 6/2021 | Lemay et al. | |
| 2007/0083735 | A1* | 4/2007 | Glew | G06F 9/3851 712/214 |
| 2008/0010413 | A1* | 1/2008 | Kailas | G06F 9/30043 711/E12.07 |
| 2010/0325395 | A1* | 12/2010 | Burger | G06F 9/3834 712/216 |
| 2014/0317742 | A1* | 10/2014 | Edwards | G06F 21/56 726/23 |
| 2020/0007332 | A1* | 1/2020 | Girkar | H04L 9/3213 |
| 2020/0089559 | A1* | 3/2020 | Ainsworth | G06F 11/1629 |
| 2021/0200673 | A1* | 7/2021 | Gupta | G06F 9/30101 |
| 2022/0012188 | A1* | 1/2022 | Durham | G06F 21/554 |
| 2022/0114104 | A1* | 4/2022 | LeMay | G06F 12/1027 |
| 2022/0121447 | A1* | 4/2022 | Basak | G06F 9/30043 |
| 2022/0391525 | A1* | 12/2022 | Breskvar | G06F 21/6218 |
| 2023/0205693 | A1* | 6/2023 | Kotra | G06F 9/30043 711/122 |

FOREIGN PATENT DOCUMENTS

WO    WO-9403860 A1 *   2/1994   ....... G06F 15/17381

* cited by examiner

*Primary Examiner* — John B King
(74) *Attorney, Agent, or Firm* — Compass IP Law PC

(57) ABSTRACT

A method comprises receiving, in a store buffer, at least a portion of a store instruction, the at least a portion of the store instruction comprising a data operand, receiving, a load instruction for execution; and determining whether the store instruction and the load instruction are in different compartments.

12 Claims, 8 Drawing Sheets

COMPARTMENT ISOLATION FOR LOAD STORE FORWARDING

BACKGROUND

Subject matter described herein relates generally to the field of computer security and more particularly to compartment isolation for load store forwarding.

Store-to-load forwarding can, in some circumstances, transiently reveal sensitive information from a store in one portion of a program through a load in a different portion of the program. The information may then be disclosed to an adversary via a side channel transmitter instruction, e.g., by controlling which cache line gets loaded. For example, this may occur even if another store between the sensitive store and the load attempts to clear the sensitive information. It may also be possible for an adversary to corrupt a subsequent store to maliciously influence program execution. For example, an adversary may have control over an instruction that writes an integer value that is then forwarded to a pointer load, which can lead to an unauthorized pointer access. Even if the types match, an integer value in a victim compartment may control access to sensitive data, e.g. if the integer represents an identifier (ID) for a privileged user.

BRIEF DESCRIPTION OF THE DRAWINGS

The detailed description is described with reference to the accompanying figures.

DETAILED DESCRIPTION

Figure 1:
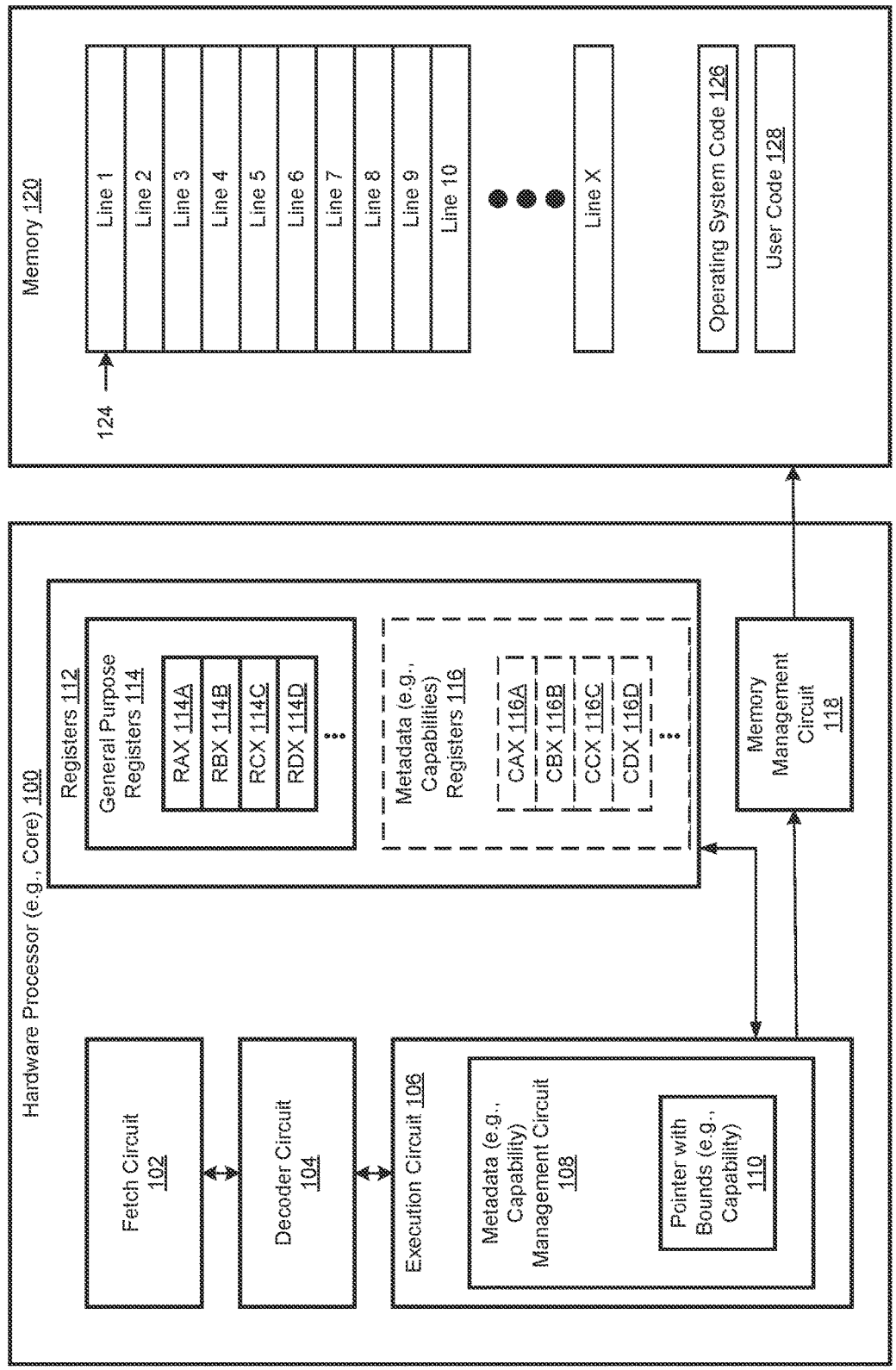
FIG. 1 is a schematic, block diagram illustration of a multiple core hardware processor in an implementation of compartment isolation for load store forwarding in accordance with some examples.

Described herein are exemplary systems and methods to implement compartment isolation for load store forwarding. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C) Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Thus, there is a need to support memory safety and scalable compartmentalization in hardware. Finer-grained compartmentalization of software can also be used to harden against side channel attacks.

In some instances, store-to-load forwarding can transiently reveal sensitive information from a store in one portion of a program through a load in a different portion of the program that may then be disclosed to an adversary via a side channel transmitter instruction, e.g., by controlling which cache line gets loaded. This may occur even if another store between the sensitive store and the load attempts to clear the sensitive information. It may also be possible for an adversary to corrupt a subsequent load to maliciously influence the program execution. For example, an adversary may have control over an instruction that writes an integer value that is then forwarded to a pointer load, which can lead to an unauthorized pointer access. This is one example that illustrates how checking type information during store-to-load forwarding can be useful for hardening the program's transient execution, since the pointer and integer would have different types To address these and other issues, described herein are systems and methods to implement typed store buffers for hardening store forwarding. In some examples described herein, when a store is performed specifying a capability (e.g., as a base address register), type information contained within the specified capability can be associated with the store buffer entry created for that store. Subsequently, when processing circuitry attempts to forward the stored data to a load, the processing circuitry can check that the load expects to receive the same type of data that was stored into that store buffer. The processor can determine the expected type from the capability used for the load. In some examples, the type information in capabilities may be stored as a numeric type ID. Further structural and methodological details relating to implementing typed store buffers for hardening store forwarding are described below with reference to FIG. 1 through FIG. 7, below.

FIG. 1 is a schematic, block diagram illustration of a multiple core hardware processor in an implementation of compartment isolation for load store forwarding in accordance with some examples. Referring to FIG. 1, hardware processor 100 (e.g., core) including a metadata (e.g., capability) management circuit 108 and coupled to a memory 120 according to examples of the disclosure. Although the metadata (e.g., capability) management circuit 108 is depicted within the execution circuit 106, it should be understood that the metadata (e.g., capability) management circuit can be located elsewhere, for example, in another component of hardware processor 100 (e.g., within fetch circuit 102) or separate from the depicted components of hardware processor 100.

In certain examples, metadata (e.g., capability) management circuit 108 enforces one or more (e.g., many) requirements for accessing (e.g., storing) security metadata or other metadata alongside each allocation (e.g., object) in memory. For example, metadata may include one or more (e.g., any single or combination of): (i) a tag (or version) number (e.g., used to prevent dangling pointers from accessing memory in a use-after free (UAF) attack), (ii) a bitmap that indicates which portions of an object contain pointers that are to be protected from corruption, (iii) a per-object key or key ID that is assigned to uniquely encrypt and/or decrypt each object, (iv) a type identification (ID) that is associated with each object of that specified type, (v) an ownership ID used to enforce (e.g., according to a Rust specification) ownership transfer and borrowing, (vi) a table specifying the category of each pointer and data item associated with each portion of an object that may contain a distinct pointer or data item, (vii) an identifier for code authorized to access the data such as a code hash value, (viii) an aggregate cryptographic message authentication code (MAC) value, Integrity-Check Value (ICV), or error correction code (ECC) for the data allocation, (ix) privilege level, (x) accessed and/or dirty bits, or (xi) tweak value or IV/counter value.

Certain examples utilize a memory corruption detection (MCD) value in each pointer and a corresponding (e.g., matching) MCD value saved in the memory for the memory being pointed to, for example, saved as (e.g., tag) metadata (e.g., data that describes other data) for each block of data being pointed to by the pointer. A MCD value may be a sequence of bits, for example, 2, 3, 4, 5, 6, 7, 8, 9, 10, 11, 12, 13, 14, 15, 16 bits, etc. In certain examples, metadata (e.g., capability) management circuit 108 validates pointers produced by instructions of the applications being executed by the processing system or processor that request access to the memory. Certain examples herein (e.g., of settings of metadata (e.g., capability) management circuit 108) utilize one of more of the following attributes for memory corruption detection: MCD enabled (e.g., to turn the MCD feature on or off), MCD position (e.g., to define the bit position(s) of MCD values (metadata) in pointers), MCD protected space, for example, a prefix in the most significant bit positions of the pointer (e.g., to define the linear address range that is to be protected by the architecture), and MCD directory base (e.g., to point to the memory MCD value (e.g., metadata) table (e.g., directory)).

Certain examples use an ownership ID to enforce (e.g., according to a Rust specification) ownership transfer and borrowing, e.g., with the ownership ID being metadata for a pointer. In certain examples, memory 120 is managed through a system of ownership with a set of rules that the compiler checks at compile time, e.g., according to a Rust specification. In certain examples, the rules of ownership include one or more (e.g., all) of: (i) each value has a variable that is called its "owner", (ii) there can only be one owner at a time for a value, and (iii) when the owner goes out of scope, the value is dropped (e.g., freed from memory).

Depicted hardware processor 100 includes a hardware fetch circuit 102 to fetch an instruction (e.g., from memory 120), e.g., an instruction that is to request access to a block (or blocks) of memory 120 through a pointer with bounds 110 (e.g., a capability) to the block (or blocks) of the memory 120. Depicted hardware processor 100 includes a hardware decoder circuit 104 to decode an instruction, e.g., an instruction that is to request access to a block (or blocks) of memory 120 through a pointer with bounds 110 (e.g., a capability) to the block (or blocks) of the memory 120. Depicted hardware execution circuit 106 is to execute the decoded instruction, e.g., an instruction that is to request access to a block (or blocks) of memory 120 through a pointer with bounds 110 (e.g., a capability) to the block (or blocks) of the memory 120.

In certain examples, metadata (e.g., capability) management circuit 108 is to, in response to receiving an instruction that is requested for fetch, decode, and/or execution, check if the instruction is a bounds-checking instruction (e.g., an instruction that is to access memory via a pointer including a bounds field) or a non-bounds instruction (e.g., a bounds-unaware instruction), for example, and (i) if a bounds instruction, is to allow access to memory 120 storing data and/or instructions (e.g., an object) within the indicated bounds (e.g., but not outside of the bounds), and/or (ii) if a non-bounds instruction, is not to allow access to memory 120 storing data and/or instructions (e.g., an object) within any bounded storage (e.g., object storage). In some examples, this latter property is enforced by applying a default bounds check to the accesses by the non-bounds instruction. In some examples, bounded storage is partially or fully accessible by non-bounds instructions. In certain examples, a bounds instruction is a bounds-checking instruction, for example, and is not a BOUND instruction that checks an array index against bounds (e.g., that determines if the first operand (array index) is within the bounds of an array specified by the second operand (bounds operand)).

In certain examples, metadata (e.g., capability) management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction (for example, an instruction authorized to manipulate capabilities, e.g., change the contents of the capabilities themselves), is to allow access to memory 120 storing (1) a capability and/or (2) data and/or instructions (e.g., an object) protected by a capability, and/or (ii) if a non-capability instruction, is not to allow access to memory 120 storing (1) a capability and/or (2) data and/or instructions (e.g., an object) protected by a capability.

In certain examples, metadata (e.g., capability) management circuit 108 is to check if an instruction is a bounds instruction or a non-bounds instruction by checking (i) a field (e.g., opcode) of the instruction (e.g., checking a corresponding bit or bits of the field that indicate if that instruction is a bounds instruction or a non-bounds instruction) and/or (ii) if a particular operand register is a "bounds" type of register (e.g., instead of a general-purpose data register) (e.g., implying that certain register(s) are not to be used to store a bounds field).

In certain examples, metadata (e.g., capability) management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular operand register is a "capability" type of register (e.g., instead of a general-purpose data register) (e.g., implying that certain register(s) are not to be used to store a capability or capabilities). In certain examples, metadata (e.g., capability) management circuit 108 is to manage the capabilities, e.g., only the metadata (e.g., capability) management circuit is to set and/or clear validity tags. In certain examples, metadata (e.g., capability) management circuit 108 is to clear the validity tag of a capability in a register in response to that register being written to by a non-capability instruction. In certain examples, capabilities are encrypted so that they are protected from corruption and forgery without requiring a validity tag. In certain examples, capabilities are split across multiple registers.

In certain examples, the source storage location (e.g., virtual address) in memory 120 for data (e.g., an object) within the bounds of the "pointer with bounds" 110 is an operand of an (e.g., supervisor level or user level) instruction (e.g., having a mnemonic of LoadData) that is to load the data (e.g., an object) included within those bounds from the memory 120 into register(s) 112. In certain examples, the source storage location (e.g., virtual address) in memory 120 for instructions within the bounds of the "pointer with bounds" 110 is accessed by the fetch circuit 102 of the hardware processor 100 to fetch the instructions within the code region demarcated by those bounds from the memory 120. In certain examples, the destination storage location (e.g., virtual address) in memory 120 for data and/or instructions (e.g., an object) to-be-protected by the bounds of the "pointer with bounds" 110 is an operand of an (e.g., supervisor level or user level) instruction (e.g., having a mnemonic of StoreData) that is to store the data and/or instructions (e.g., an object) protected by those bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the bounds field, e.g., to set the lower bound and/or upper bound of an object.

In certain examples, the source storage location (e.g., virtual address) in memory 120 for data and/or instructions (e.g., an object) protected by the metadata and/or bounds of the "pointer with metadata and/or bounds" 110 (e.g., capability) is an operand of an (e.g., supervisor level or user level) instruction (e.g., having a mnemonic of LoadData) that is to load the data and/or instructions (e.g., an object) protected by the metadata and/or bounds from the memory 120 into register(s) 112. In certain examples, the destination storage location (e.g., virtual address) in memory 120 for data and/or instructions (e.g., an object) to-be-protected by the metadata and/or bounds of the "pointer with metadata and/or bounds" 110 is an operand of an (e.g., supervisor level or user level) instruction (e.g., having a mnemonic of StoreData) that is to store the data and/or instructions (e.g., an object) protected by the metadata and/or bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the metadata and/or bounds field(s) (e.g., the fields in FIGS. 2A-4), e.g., to set the metadata and/or bound(s) of an object. In certain examples, an instruction set architecture (ISA) includes one or more instructions for manipulating the capability field(s) (e.g., the fields in FIGS. 2A-4), e.g., to set the metadata and/or bound(s) of an object in memory.

In certain examples, metadata (e.g., capability) management circuit 108 is to enforce security properties on changes to metadata (e.g., capability data), for example, for the execution of a single capability instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability unsealing and invocation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, metadata (e.g., capability) management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy"

problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a metadata (e.g., capability) management circuit 108 provide the foundation on which a capability-based OS, compiler, and runtime can implement, for a certain programming language (e.g., C and/or C++) language, memory safety and compartmentalization.

In certain examples, the capability points to an object that is stored in multiple lines of data. For example, a block of memory may be lines 1 and 2 of data of the (e.g., physical) addressable memory 122 of memory 120 having an address 124 to one (e.g., the first) line (e.g., line 1). Certain examples have a memory of a total size X, where X is any positive integer.

In certain examples, the capability is stored in a single line of data (or less than a single line of data). In certain examples, the capability is stored in multiple lines of data. In certain examples, capabilities (e.g., one or more fields thereof) themselves are also stored in memory 120, for example, in a data structure (e.g., table) for capabilities. In certain examples, a (e.g., validity) tag is stored in a data structure for a capability stored in memory. In certain examples, tags (e.g., in a data structure) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated for use with metadata (e.g., capabilities)) metadata (e.g., capabilities) register(s) 116 (e.g., registers CAX 116A, CBX 116B, CCX 116C, CDX 116D, etc.).

Hardware processor 100 includes a coupling (e.g., connection) to memory 120. In certain examples, memory 120 is a memory local to the hardware processor (e.g., system memory). In certain examples, memory 120 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In certain examples, an indication (e.g., name) of the destination register for data and/or instructions (e.g., an object) protected by the metadata and/or bounds of the "pointer with metadata and/or bounds" 110 in register(s) 112 is an operand of an (e.g., supervisor level or user level) instruction (e.g., having a mnemonic of LoadData) that is to load the data and/or instructions (e.g., an object) to-be-protected by the metadata and/or bounds of the "pointer with metadata and/or bounds" 110 from the memory 120 into register(s) 112. In certain examples, an indication (e.g., name) of the source register for data and/or instructions (e.g., an object) to-be-protected by the metadata and/or bounds of the "pointer with metadata and/or bounds" 110 in register(s) 112 is an operand of an (e.g., supervisor level or user level) instruction (e.g., having a mnemonic of Store-Data) that is to store the data and/or instructions (e.g., an object) from the register(s) 112 into memory 120.

In certain examples, metadata (e.g., capability) management circuit 108 uses bounds-based access control for enforcing memory safety, e.g., and low-overhead compartmentalization. Examples herein are directed to metadata (e.g., capability) management circuit 108 for implementing compartment isolation for load store forwarding. Examples herein are directed to metadata (e.g., capability) management circuit 108 for implementing non-redundant metadata storage in memory 120 that is addressed by a pointer 110 including a bounds field and a metadata field (e.g., a capability including a bounds field and a metadata field), and thus do not waste memory or (e.g., unduly) limit the amount of metadata that can be associated with each object in memory. Examples herein are directed to metadata (e.g., capability) management circuit 108 for implementing non-redundant security metadata storage in memory 120 that is addressed by a pointer 110 including a bounds field and a security field (e.g., a capability including a bounds field and a security field (e.g., validity tag)), and thus provide enhanced security (e.g., via security metadata) and do not waste memory or limit the amount of metadata that can be associated with each object in memory.

The circuitry, methods, and a storage format for implementing compartment isolation for load store forwarding disclosed herein are improvements to the functioning of a processor (e.g., of a computer) itself, e.g., they are improvements to the functioning of a processor (e.g., of a computer) itself as they provide enhanced security (e.g., via security metadata) and do not waste memory or limit the amount of metadata that can be associated with each object in memory.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by metadata (e.g., capability) management circuit 108). In certain examples, each element of the capability contributes to the protection model and is enforced by hardware (e.g., metadata (e.g., capability) management circuit 108).

In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figure 2:
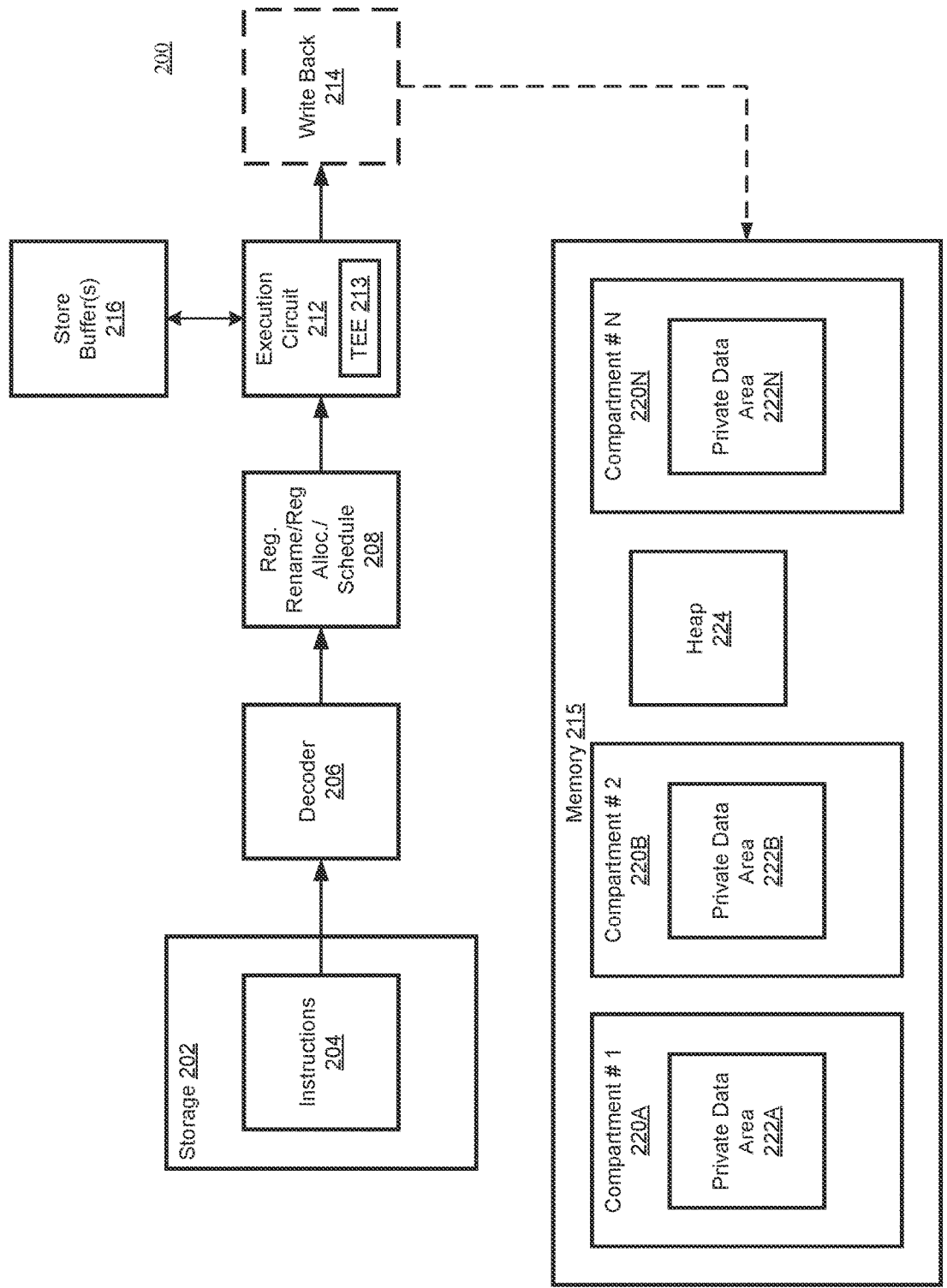
FIG. 2 is a schematic illustration of a hardware processor coupled to storage that may be used to implement compartment isolation for load store forwarding in accordance with some examples.

FIG. 2 is a schematic illustration of a hardware processor coupled to storage that may be used to implement compartment isolation for load store forwarding in accordance with some examples. Referring to FIG. 2, hardware processor 200 may be coupled to storage 202 that includes one or more instructions 204 to be executed. In some embodiments, e.g., in response to a request to perform an operation, an instruction (e.g., macro-instruction) is fetched from storage 202 and sent to decoder 206. In the depicted embodiment, the decoder 26 (e.g., decoder circuit) decodes the instruction into a decoded instruction (e.g., one or more micro-instructions or micro-operations). The decoded instruction is then sent for execution, e.g., via register rename/allocator and scheduler circuit 208 to schedule the decoded instruction for execution.

In certain embodiments, (e.g., where the processor/core supports out-of-order (OoO) execution), the processor 200 includes a register rename/allocator and scheduler circuit 208 may allocate resources and perform register renaming on registers (e.g., registers associated with the instruction). In certain embodiments, (e.g., for out-of-order execution), the processor includes one or more scheduler circuits 408 that may schedule one or more operations associated with decoded instructions, including one or more operations decoded from a memory safety enforcement instruction, for execution on the execution circuit 212. Execution circuit 212 may comprise a trusted execution environment (TEE) 213, which may be used to implement encoded capabilities and/or other confidential functionality. TEE 213 may also provision and configure a plurality of compartments #1-#N, labeled as 220A, 220B-220N each with a private data area, labeled as 222A, 222B-222N, and all sharing heap 224 in memory 215.

In certain embodiments, a write back circuit 214 is included to write back results of an instruction to a destination (e.g., write them to a register(s) and/or memory), for example, so those results are visible within a processor (e.g., visible outside of the execution circuit that produced those results). One or more store buffers 216 may be communicatively coupled to the execution circuit 212 and/or the write back circuit 214.

In certain embodiments, if a check being performed to determine whether a compartment associated with a store instruction does not match a compartment in a corresponding load instruction fails, then in response to the failure the processor 200 does not allow the store buffer data to be forwarded to the load instruction.

Figure 3:
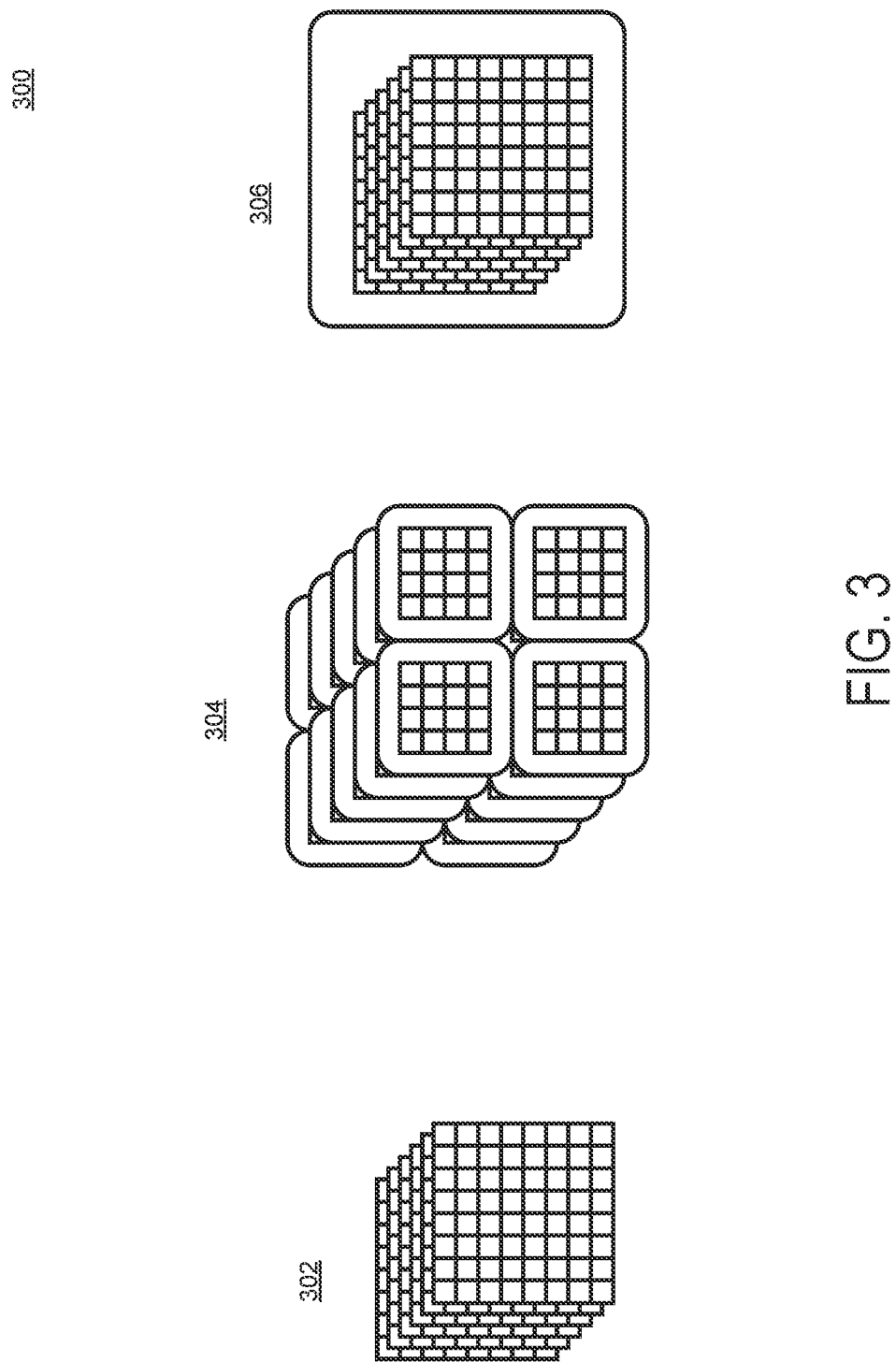
FIG. 3 is a schematic illustration of memory compartments in a memory address space in accordance with some examples.

FIG. 3 is a schematic illustration of memory compartments in a memory address space in accordance with some examples. Referring to FIG. 3, multiple compartments (a.k.a., functions, services, microservices, or FaaS) occupy address spaces in each of memory maps 302, 304, and 306. In memory map 302, each compartment has its own address space. In memory map 304, each compartment is assigned a partition of an address space, with 16 possible partitions per address space. In memory map 306, all functions are part of a single address space.

Figure 4:
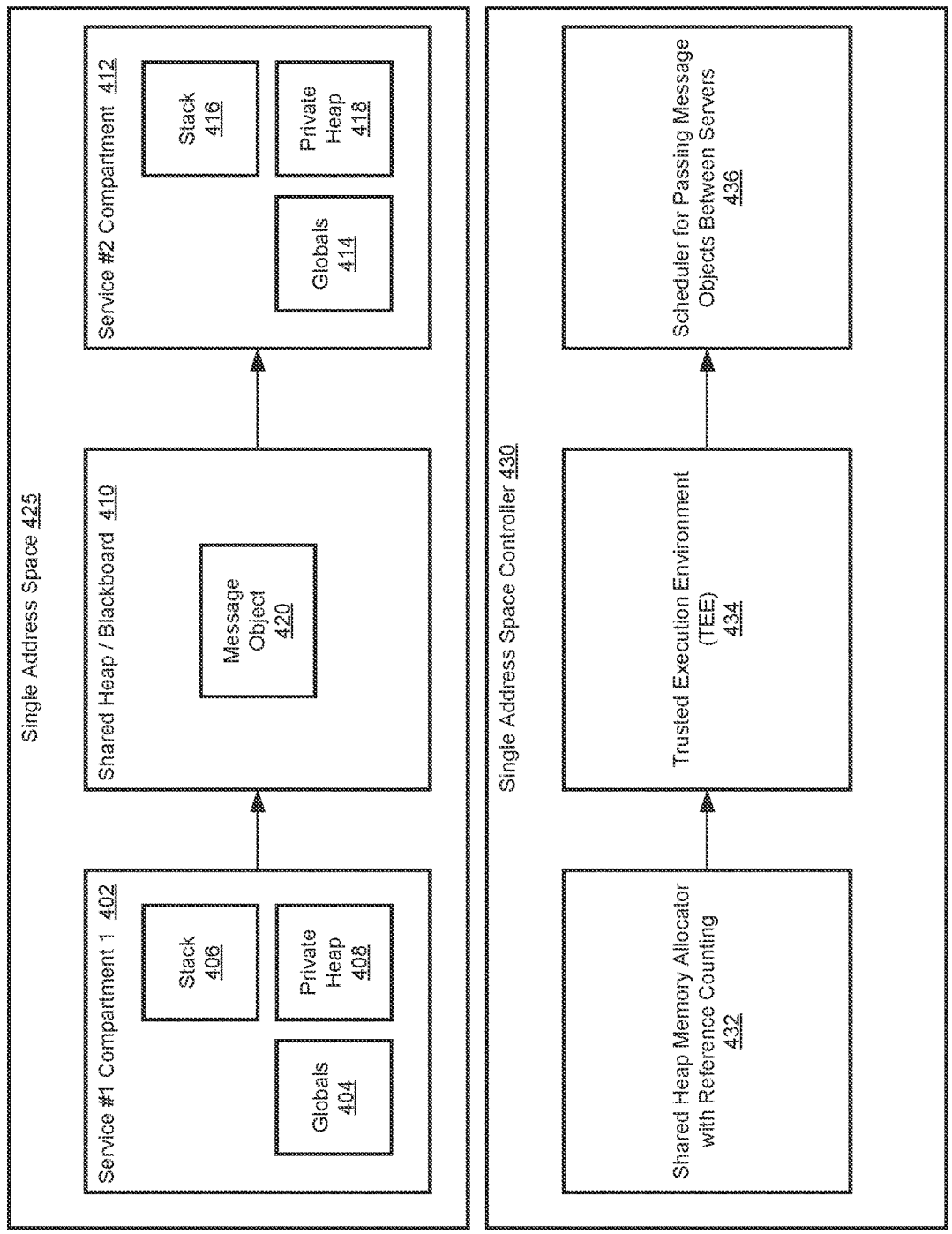
FIG. 4 is a schematic illustration of a system with multiple service compartments in a memory in accordance with some examples.

FIG. 4 is a schematic illustration of a system with multiple service compartments in a memory in accordance with some examples. Referring to FIG. 4, system 400 includes service #1 compartment 402, which includes its stack 406, its private heap 408 and its globals 404 (i.e., global variables stored in registers or memory). Stack 406, private heap 408, and globals 404 are sometimes referred to herein as existing within a "private memory area" or "private memory region" of service #1 compartment 402. Also shown is service #2 compartment 412, which includes its stack 416, its private heap 418, and its globals 414 (i.e., global variables stored in registers or memory). Stack 416, private heap 418, and globals 414 are sometimes referred to herein as existing within a "private memory area" or "private memory region" of service #2 compartment 412. It should be understood that the stack, heap, and globals are logical structures shown for each of the compartments, but that in some embodiments, a single memory is used to serve all three functions. Also illustrated is shared heap/blackboard 410, with a message object 420 in transition from service #1 compartment 402 to service #2 compartment 412. As shown, service #1 compartment 402, service #2 compartment 412 and shared heap 410 are all part of a single address space 425.

Also illustrated is single address space controller 430, which includes shared heap memory allocator with reference counting 432, trusted execution environment (TEE) 434, and a scheduler for passing message objects between services 436. The illustrated components of single address space controller 430 include circuitry and memory resources to perform their functions. In some embodiments, as here, code and services running as part of the service compartments is controlled by the TEE 434, which in some embodiments is provided as Intel® SGX to defend the software runtime and the applications against the types of attacks that are in scope for the TEE 434 in use.

In operation, the TEE 434 is to partition an address space within the memory into a plurality of compartments, shown here as compartments 402 and 412, and shared heap 410. Each compartment 402 and 412 here includes a private memory associated with code to execute a function. Here, compartments 402 and 412 have private memory areas that include their stack, private heap, and globals. In some embodiments, the TEE 434 is to provision the functions and schedule operation of the code for service #1 compartment and service #2 compartment. As used herein, that code can be termed a service, a microservice, a networked service, or a function-as-a-service (FaaS). As part of the provisioning, the TEE 434 assigns pointers to one or more message objects stored in the shared heap. The TEE 434 thus allocates memory for use to buffer a message and provides a pointer to each of the compartments to access the message object(s).

Continuing operation, at some point, after the code in service #1 compartment begins to run, the TEE 434 receives a request to send a message from a first compartment, the request including a pointer to a message block in the heap, and a destination compartment identifier (i.e., service #2 compartment 412). In response, the TEE 434 authenticates the request, generates a corresponding encoded capability, conveys the encoded capability to the destination compartment, and schedules the destination compartment to respond to the request. Subsequently, the TEE 434 receives a check capability request from service #2 compartment 412, and responds by checking the encoded capability and, when the check passes, providing service #2 compartment 412 a memory address to access the message block, and, otherwise, generating a fault. As shown, each compartment is isolated from other compartments, is unable to access private memory regions of other compartments, and is unable to access any message objects in the heap that are assigned to other compartments.

Further examples of encoded inline capabilities are described in U.S. Pat. No. 10,860,709, issued Dec. 8, 2020 to Lemay, et al., entitled ENCODED INLINE CAPABILITIES, the disclosure of which is incorporated by reference here in its entirety. Further examples of compartmentalization are described in U.S. Pat. No. 11,030,113, issued Jun. 8, 2021 to Durham, et al., entitled APPARATUS AND METHOD FOR EFFICIENT PROCESS-BASED COMPARTMENTALIZATION, the disclosure of which is incorporated by reference here in its entirety. Further examples of pointer-based encryption are described in U.S. Patent Publication No. 20200125501 to Durham, et al., published Apr. 23, 2020 to Lemay, et al., entitled POINTER-BASED DATA ENCRYPTION, the disclosure of which is incorporated by reference here in its entirety. Further examples of cryptographic computing are described in U.S. Patent Publication No. 20200159676 to Durham, et al., published Apr. 23, 2020 to Lemay, et al., entitled CRYPTOGRAPHIC COMPUTING USING ENCRYPTED BASE ADDRESSES AND USED IN MULTI-TENANT ENVIRONMENTS, the disclosure of which is incorporated by reference here in its entirety Having described various hardware systems and data structures useful to implement compartment isolation for load store forwarding in accordance with some examples, various operations in methods to implement compartment isolation for load store forwarding in accordance with some examples will be described with reference to FIG. 5 and FIG. 6.

Figure 5:
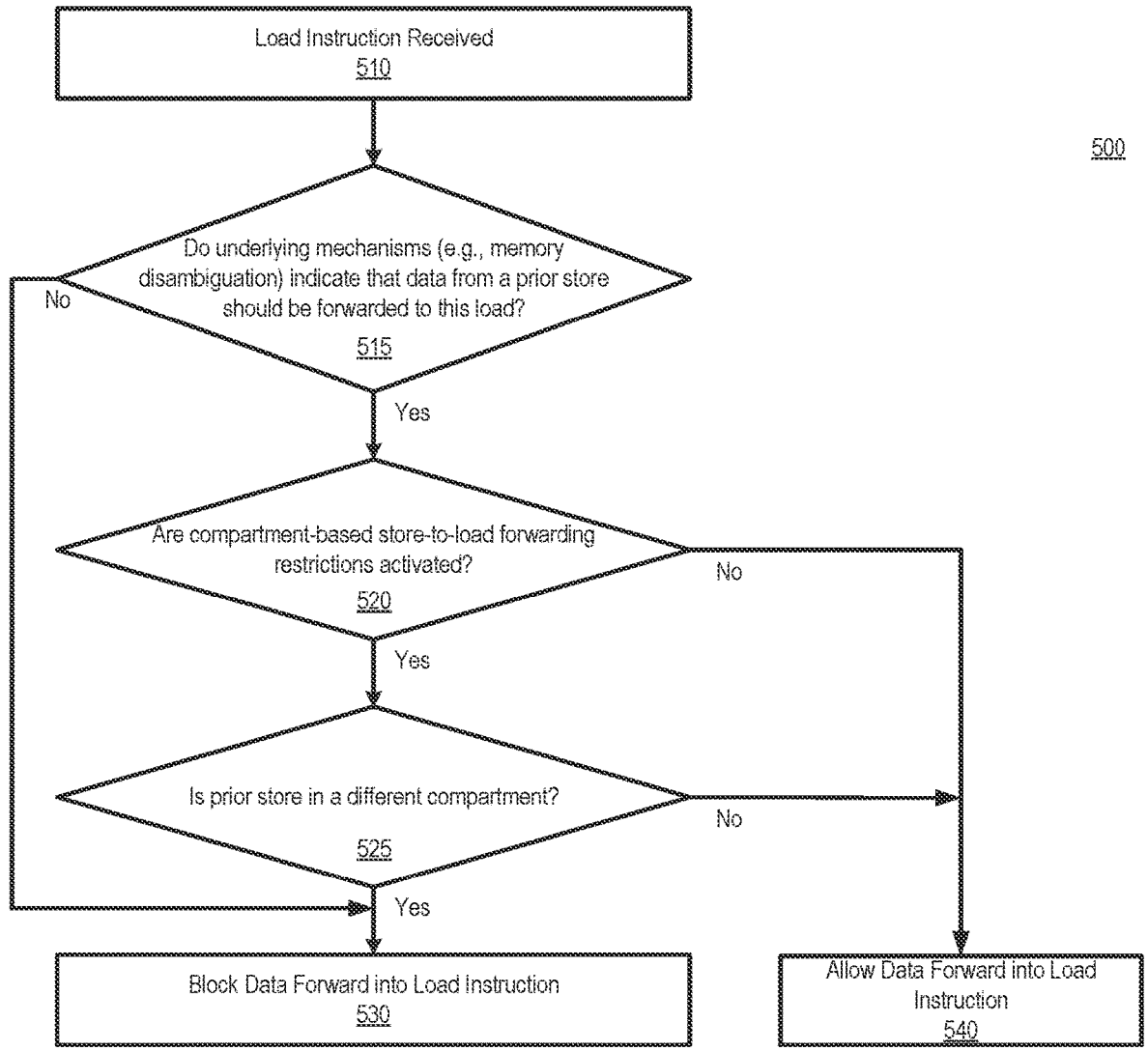
FIG. 5 is a flowchart illustrating operations in a method to implement compartment isolation for load store forwarding in accordance with some examples.

FIG. 5 is a flowchart illustrating operations in a method to implement compartment isolation for load store forwarding in accordance with some examples. Referring to FIG. 5, at operation 510 a load instruction is received for execution. In the example processor 200 depicted in FIG. 2 a load instruction may be received from the instructions 204 in memory 202.

If, at operation 515, underlying mechanisms such as, e.g., memory disambiguation, indicate that data from a prior store operation should be forwarded to the load operation received at operation 510, then operation 520 is implemented. By contrast, at operation 515, underlying mechanisms such as, e.g., memory disambiguation, indicate that data from a prior store operation should not be forwarded to the load operation received at operation 510, then operations 520 and 525 are bypassed and operation 530 is implemented to block the data from the prior store instruction from being forwarded to the load instruction.

If, at operation 520 compartment-based store-to-load forwarding restrictions are activated, e.g., due to a bit being set in a new Control Register (CR) or Model-Specific Register (MSR) for controlling these restrictions, then operation 525 is implemented. By contrast, if at operation 520 compartment-based store-to-load forwarding restrictions are not activated then operation 540 is implemented and data from the store instruction is forwarded into the load instruction. In some examples compartment-based store-to-load restrictions may be activated in a binary fashion for processing operations implemented by a data processing system. By contrast, in other examples compartment-based store-to-load restrictions may be implemented in a more granular fashion. For example, compartment-based store-to-load restrictions may be implemented at an application level only for certain portions of a software program that require confidential computing. Alternatively, or in addition, compartment-based store-to-load restrictions may be implemented in a dynamic fashion based on one or more operating parameters of a processing system.

If, at operation 525, the prior store instruction is in a compartment that is different from the load operation received in operation 510, then operation 530 is implemented and the data from the prior store operation is blocked from being forwarded into the load instruction received in operation 510. By contrast, if at operation 525 the prior store instruction is in the same compartment as the load operation received in operation 510, then operation 540 is implemented and the data from the prior store operation is allowed to be forwarded into the load instruction.

Figure 6:
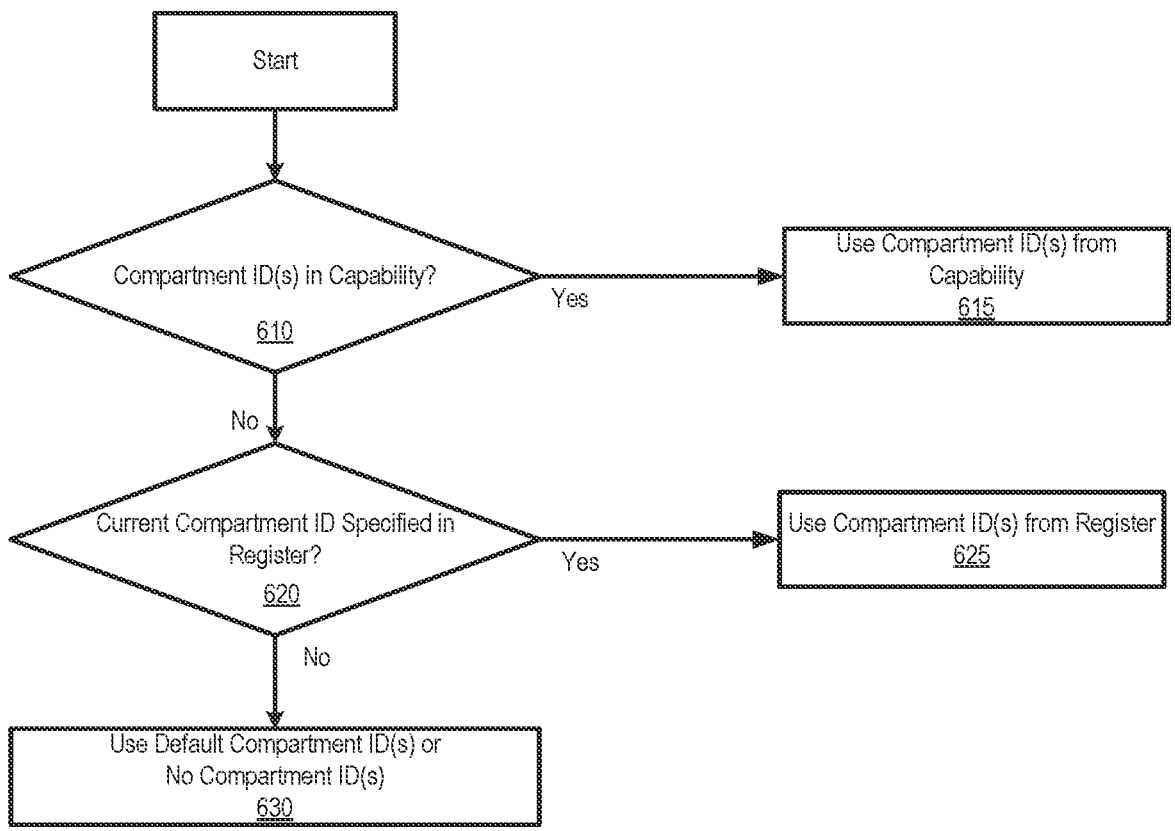
FIG. 6 is a flowchart illustrating operations in a method to implement compartment isolation for load store forwarding in accordance with some examples.

In some examples, the compartment ID for each memory access may be determined using one or more of the techniques illustrated in FIG. 6. Referring to FIG. 6, if at operation 610 there are compartment IDs in in a capability field of a pointer associated with the prior store instruction and the load instruction received in operation 510, then operation 615 is implemented and the compartment ID(s) from the capability may be used. By contrast, if at operation 615 there are not compartment IDs in a capability field of a pointer associated with the prior store instruction and the load instruction received in operation 510, then operation 620 is implemented.

If, at operation 620, the current compartment identifier(s) (IDs) are specified in one or more registers associated with the prior store instruction and the load instruction, then operation 625 is implemented and the compartment IDs from the register(s) may be used. By contrast, if at operation 620 there are not compartment identifiers (IDs) specified in one or more registers associated with the prior store instruction and the load instruction, then operation 635 is implemented, and either the default compartment ID(s) are used or no compartment IDs are used.

Figure 7:
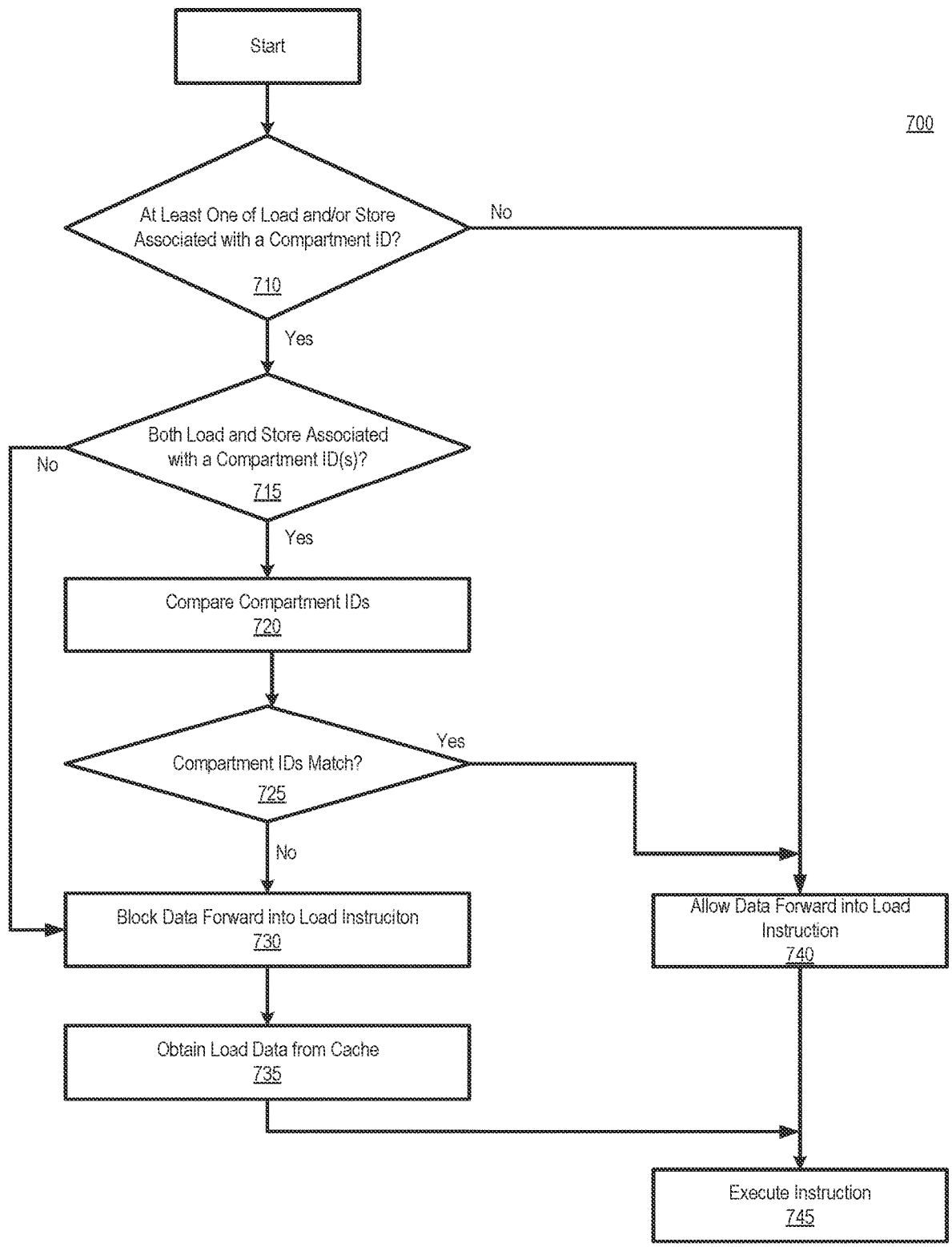
FIG. 7 is a flowchart illustrating operations in a method to implement compartment isolation for load store forwarding in accordance with some examples.
Figure 8:
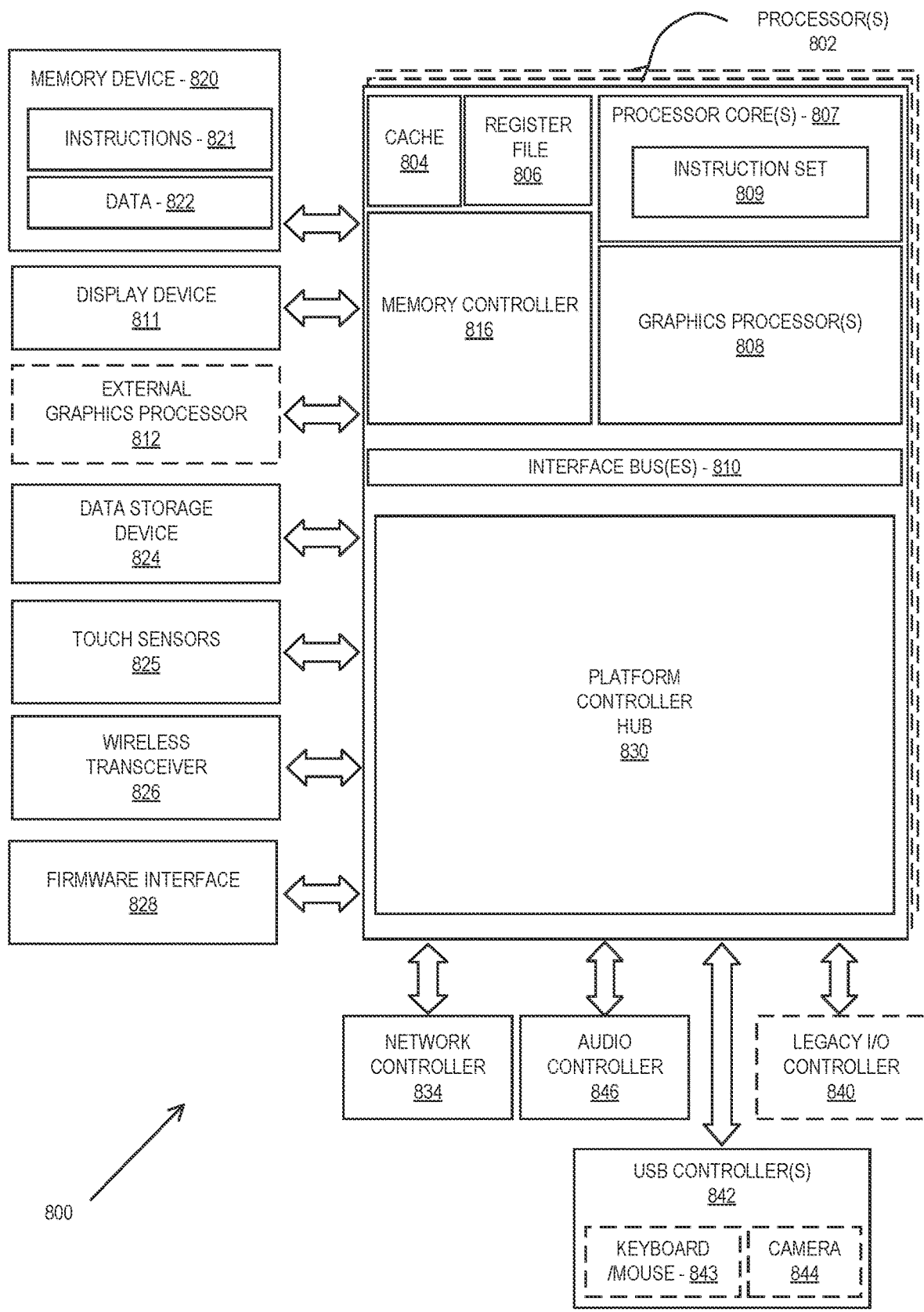
FIG. 8 is a schematic illustration of a computing architecture which may be adapted to implement compartment isolation for load store forwarding in accordance with some examples.

In some examples, a determination of whether to allow data associated with a store instruction to be forwarded to a load instruction buffer may be implemented using one or more of the techniques illustrated in FIG. 7. Referring to FIG. 7, if at operation 710 neither the load instruction nor the store instruction is associated with a compartment ID, then operation 740 is implemented and data from the store instruction buffer is allowed to be forwarded into the load instruction buffer, and the load instruction is executed at operation 745. By contrast, if at operation 710 at least one of the load instruction and/or store instruction are associated with a compartment ID, then operation 715 is implemented.

If, at operation 715, both the load instruction and the store instruction are not associated with a compartment ID (i.e., only one of the load instruction or the store instruction is associated with a compartment ID), then operation 730 is implemented and the data associated with the store instruction buffer is blocked from being forwarded into the load instruction buffer. Operation 735 is then implemented and the data for the load instruction is obtained from cache, and the load instruction is executed at operation 745.

By contrast, if at operation 715 both the store instruction and the load instruction are associated with compartment IDs, then operation 720 is implemented and the compartment IDs from the store instruction and the load instruction are compared. If, at operation 725 the compartment IDs match, then operation 740 is implemented and data from the store instruction buffer is forwarded into the load instruction buffer, and the load instruction is executed at operation 745.

By contrast, if at operation 725 the compartment IDs do not match, then operation 730 is implemented and the data associated with the store instruction buffer is blocked from being forwarded into the load instruction buffer. Operation 735 is then implemented and the data for the load instruction is obtained from cache, and the load instruction is executed at operation 745.

A compartment ID register may specify an arbitrary numeric ID set by software, e.g., an operating system. Alternatively, a compartment ID may equivalently be derived from an existing register with a value that may be unique to each compartment, such as a key for encrypting or authenticating pointers or data. The compartment ID may be represented in a compact format in microarchitectural buffers such as store buffers. For example, the processor may maintain mapping from full compartment IDs as specified in registers to compact compartment IDs. For example, the processor may support sixteen simultaneous compartment IDs in microarchitectural buffers, which would only require four bits of storage within each buffer. The processor could detect when more than sixteen simultaneous compartment IDs are in use and it may select one of them to replace with a different compartment ID. For example, the processor may record which compartment IDs were more or less recently used and replace the least recently used compartment ID. The processor may wait until all store buffers associated with the compartment ID to replaced have been fully processed and discarded prior to permitting a store buffer with the new compartment ID from being initialized.

Certain efficient encodings may be possible for indicating which store data entries belong to exited compartments in lieu of recording distinct compartment identities. The processor could sweep through all active store data entries when switching to a new compartment and mark all active store data entries as belonging to an exited compartment without recording the exact identity of the compartment.

Alternatively, to completely avoid needing to record for each store what compartment it belongs to, store data buffers can be drained when switching compartments so that no store data from an exited compartment will be considered for forwarding to loads. However, that would have the drawback of slowing compartment switches while waiting for store data to drain.

Analogously to comparing compartment IDs, it may be useful to alternatively or additionally compare address space identifiers, e.g., for compartments assigned distinct page tables or separate processes or VMs. For example, those identifiers could be derived from CR3 values or Extended Page Table (EPT) values.

If there is a possibility of a memory region being shared between compartments or reassigned to a different compartment, then it may be useful to permit one compartment to clear sensitive values from the shared or reassigned memory region prior to executing loads in the other compartment. For example, the presence of shared or reassigned memory within the address space may be indicated by a CR or MSR bit. When that indicator is set, the processor may cause loads to wait until prior stores from another compartment have all completed. Alternatively, a particular page may be marked as shared between compartments or address spaces using a Page Table Entry (PTE) bit that may be cached in a Translation Lookaside Buffer (TLB). In that case, the processor may delay loads to just pages marked as shared or reassigned until prior stores from another compartment have all completed. To reduce the number of delayed loads, the PTE may specify the identity or identities of compartments with which the page is shared or to which the page was previously assigned so that loads wait only for stores from compartments different from the active one that have been specified.

Some embodiments may use a specialized instruction for clearing sensitive values from memory, e.g., named "Clear-Sensitive." The use of that instruction may cause the associated store buffer to be marked as a store for clearing sensitive values. That may reduce the need for delaying loads to wait for stores, since the processor could avoid waiting for ordinary stores that do not clear sensitive values.

Thus, the operations depicted in FIGS. 5-7 enable a processing device to determine whether a load instruction and the prior store instruction operate within the same compartment. If they do not operate within the same compartment, then the processor does not allow the store buffer data to be forwarded to the load instruction, thereby preventing execution of the load instruction.

FIG. 7 is a schematic illustration of a computing architecture which may be adapted to implement typed store buffers for hardening store forwarding in accordance with some examples. In various embodiments, the computing architecture 700 may comprise or be implemented as part of an electronic device. In some embodiments, the computing architecture 700 may be representative, for example of a computer system that implements one or more components of the operating environments described above. In some embodiments, computing architecture 700 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following pertains to further examples.

Example 1 is an apparatus comprising a store buffer to receive at least a portion of a store instruction, the at least a portion of the store instruction comprising a data operand; and processing circuitry to receive a load instruction for execution; and determine whether the store instruction and the load instruction are in different compartments.

In Example 2, the subject matter of Example 1 can optionally include processing circuitry to compare a first compartment identifier associated with the load instruction to a second compartment identifier associated with the store instruction; and determine whether the first compartment identifier matches the second compartment identifier.

In Example 3, the subject matter of any one of Examples 1-2 can optionally include processing circuitry to forward at least a portion of the store instruction for execution with the load instruction in response to a determination that the first compartment identifier matches the second compartment identifier.

In Example 4, the subject matter of any one of Examples 1-3 can optionally include processing circuitry to block at least a portion of the store instruction from execution with the load instruction in response to a determination that the first compartment identifier does not match the second compartment identifier.

In Example 5, the subject matter of any one of Examples 1-4 can optionally include processing circuitry to generate a fault in response to a determination that the first compartment identifier does not match the second compartment identifier.

In Example 6, the subject matter of any one of Examples 1-5 can optionally include processing circuitry to obtain the second capability identifier from operand from at least one of a hardware register or an in-line capability associated with the store instruction.

In Example 7, the subject matter of any one of Examples 1-6 can optionally include processing circuitry to determine whether the store instruction is associated with an active compartment.

Example 8 is a method, comprising receiving, in a store buffer, at least a portion of a store instruction, the at least a portion of the store instruction comprising a data operand; receiving, a load instruction for execution; and determining whether the store instruction and the load instruction are in different compartments.

In Example 9, the subject matter of Example 8 can optionally include comparing a first compartment identifier associated with the load instruction to a second compartment identifier associated with the store instruction; and determining whether the first compartment identifier matches the second compartment identifier.

In Example 10, the subject matter of any one of Examples 8-9 can optionally include forwarding at least a portion of the store instruction for execution with the load instruction in response to a determination that the first compartment identifier matches the second compartment identifier.

In Example 11, the subject matter of any one of Examples 8-10 can optionally include blocking at least a portion of the store instruction from execution with the load instruction in response to a determination that the first compartment identifier does not match the second compartment identifier.

In Example 12, the subject matter of any one of Examples 8-11 can optionally include generating a fault in response to a determination that the first compartment identifier does not match the second compartment identifier.

In Example 13, the subject matter of any one of Examples 8-12 can optionally include obtaining the second capability identifier from operand from at least one of a hardware register or an in-line capability associated with the store instruction.

In Example 14, the subject matter of any one of Examples 8-13 can optionally include determining whether the store instruction is associated with an active compartment.

Example 15 is a non-transitory computer readable medium comprising instructions which, when executed by a processor, configure the processor to receive, in a store buffer, at least a portion of a store instruction, the at least a portion of the store instruction comprising a data operand; receive, a load instruction for execution; and determine whether the store instruction and the load instruction are in different compartments In Example 16, the subject matter of Example 15 can optionally include the subject matter of claim 15, comprising instructions to compare a first compartment identifier associated with the load instruction to a second compartment identifier associated with the store instruction; and determine whether the first compartment identifier matches the second compartment identifier.

In Example 17, the subject matter of any one of Examples 15-16 can optionally include instructions to forward at least a portion of the store instruction for execution with the load instruction in response to a determination that the first compartment identifier matches the second compartment identifier.

In Example 18, the subject matter of any one of Examples 15-17 can optionally include instructions to block at least a portion of the store instruction from execution with the load instruction in response to a determination that the first compartment identifier does not match the second compartment identifier.

In Example 19, the subject matter of any one of Examples 15-18 can optionally include instructions to generate a fault in response to a determination that the first compartment identifier does not match the second compartment identifier.

In Example 20, the subject matter of any one of Examples 15-19 can optionally include instructions to obtain the second capability identifier from operand from at least one of a hardware register or an in-line capability associated with the store instruction.

In Example 21, the subject matter of any one of Examples 15-20 can optionally include instructions to determine whether the store instruction is associated with an active compartment.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   a store buffer to receive at least a portion of a store instruction, the at least a portion of the store instruction comprising a data operand; and
   processing circuitry to:
   receive a load instruction for execution;
   compare a first compartment identifier associated with the load instruction to a second compartment identifier associated with the store instruction;
   forward at least a portion of the store instruction for execution with the load instruction in response to a determination that the first compartment identifier matches the second compartment identifier; and
   block at least a portion of the store instruction from execution with the load instruction in response to a determination that the first compartment identifier does not match the second compartment identifier.

2. The apparatus of claim 1, the processing circuitry to:
   generate a fault in response to a determination that the first compartment identifier does not match the second compartment identifier.

3. The apparatus of claim 1, the processing circuitry to:
   obtain the second compartment identifier from operand from at least one of a hardware register or an in-line capability associated with the store instruction.

4. The apparatus of claim 1, the processing circuitry to:
   determine whether the store instruction is associated with an active compartment.

5. A method, comprising:
   receiving, in a store buffer, at least a portion of a store instruction, the at least a portion of the store instruction comprising a data operand;
   receiving, a load instruction for execution; and
   comparing a first compartment identifier associated with the load instruction to a second compartment identifier associated with the store instruction;
   forwarding at least a portion of the store instruction for execution with the load instruction in response to a determination that the first compartment identifier matches the second compartment identifier; and
   blocking at least a portion of the store instruction from execution with the load instruction in response to a determination that the first compartment identifier does not match the second compartment identifier.

6. The method of claim 5, further comprising:
   generating a fault in response to a determination that the first compartment identifier does not match the second compartment identifier.

7. The method of claim 5, further comprising:
   obtaining the second compartment identifier from at least one of a hardware register or an in-line capability associated with the store instruction.

8. The method of claim 5, further comprising:
   determining whether the store instruction is associated with an active compartment.

9. A non-transitory computer readable medium comprising instructions which, when executed by a processor, configure the processor to:
   receive, in a store buffer, at least a portion of a store instruction, the at least a portion of the store instruction comprising a data operand;
   receive, a load instruction for execution;

compare a first compartment identifier associated with the load instruction to a second compartment identifier associated with the store instruction;

forward at least a portion of the store instruction for execution with the load instruction in response to a determination that the first compartment identifier matches the second compartment identifier; and block at least a portion of the store instruction from execution with the load instruction in response to a determination that the first compartment identifier does not match the second compartment identifier.

10. The non-transitory computer readable medium of claim 9, comprising instructions to:

generate a fault in response to a determination that the first compartment identifier does not match the second compartment identifier.

11. The non-transitory computer readable medium of claim 10, comprising instructions to:

obtain the second compartment identifier from operand from at least one of a hardware register or an in-line capability associated with the store instruction.

12. The non-transitory computer readable medium of claim 11, further comprising instructions to:

determine whether the store instruction is associated with an active compartment.

* * * * *